Feb. 28, 1928.

R. J. HEWETT 1,660,332

FLASH LIGHT RAILWAY SIGNALING SYSTEM

Filed April 24, 1924 2 Sheets-Sheet 1

INVENTOR.
Robert J. Hewett
BY Stockbridge & Borst
ATTORNEYS.

Feb. 28, 1928.

R. J. HEWETT 1,660,332

FLASH LIGHT RAILWAY SIGNALING SYSTEM

Filed April 24, 1924    2 Sheets-Sheet 2

Red and Green Flash alternately For Caution.

INVENTOR.
Robert J. Hewett
BY Stockbridge & Borst
ATTORNEYS.

Patented Feb. 28, 1928.

1,660,332

UNITED STATES PATENT OFFICE.

ROBERT J. HEWETT, OF WESTFIELD, NEW JERSEY.

FLASH-LIGHT RAILWAY SIGNALING SYSTEM.

Application filed April 24, 1924. Serial No. 708,687.

This invention relates to railway signaling systems in which light signals are used for controlling train movements both day and night in place of the usual semaphore signal. The present signaling practice requires that the signal system should be capable of giving three indications for governing the movement of trains. In the color light signal systems as now practiced, these three indications are given by the colors red, yellow and green.

My invention has for an object to provide an improved color light signal system in which two color lights, such as red and green, for example, will give the three indications, and which will be relatively simple and reliable. Various other objects will be apparent from the following description of embodiments of the invention and the novel features will be particularly pointed out hereinafter in claims.

In accordance with the invention, one of the lights, such as the yellow light, may be omitted and in place of it a flashing condition of either or both of the other lights, such as the green light or the red light, may be substituted. For example, the flashing condition of the green light or alternately both green and red lights may indicate caution and the steady condition of the green light indicate proceed; the steady condition of the red light indicates stop as usual. In a similar way the flashing condition of the red light may be used for caution and the steady condition of the red light will indicate stop and the steady condition of the green light will indicate proceed. The essential feature of the invention consists in the use of a steady condition and a flashing condition of the same light for governing train movements. The system may therefore be termed a flash light railway signaling system.

In the accompanying drawings:—

Figure 1:
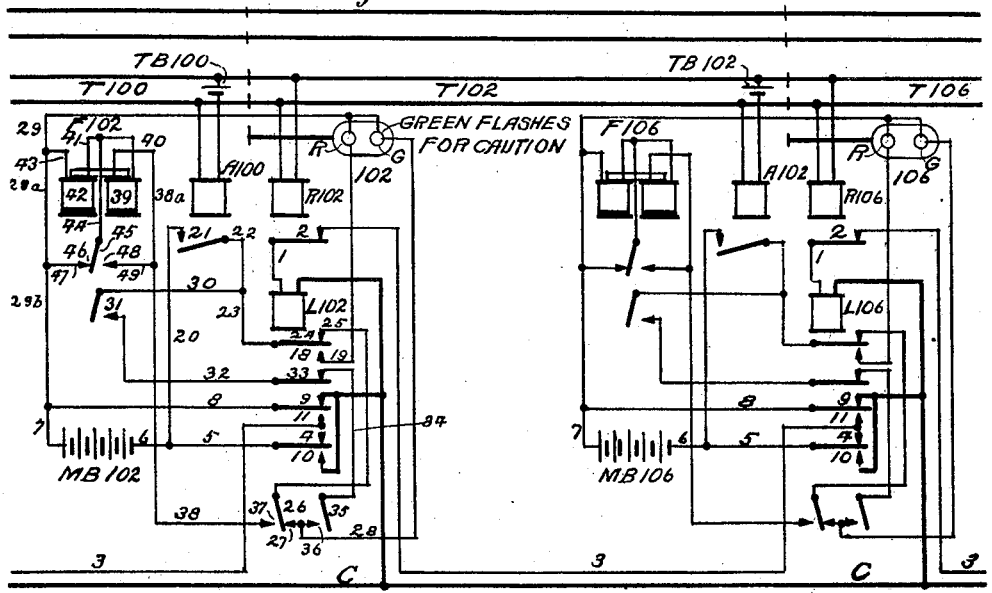
Fig. 1 is a circuit diagram illustrating the application of the invention to a stretch of track, with the color signal normally used to indicate a clear condition of the track, flashing to indicate caution.

In Fig. 1 I have illustrated the complete circuit arrangement for controlling east bound flash light signal 102. The lower light R is the usual red light signal. The yellow light signal is not used. The upper light G is the green light signal and is provided with two operative conditions, the usual steady green light condition which indicates proceed, and a flashing green light condition which indicates caution. The flashing operative condition of the green light G may be produced by the polarized flasher relay F 102 which will be described farther on.

The control circuits for signal 102 are as usual for the control of light signals and are as follows: Track section T 102 is provided with a track relay R 102 at signal 102 and a track battery TB 102 at the other end, that is at signal 106. The battery circuit for track battery TB 102 includes a special low resistance track relay A 102 which is connected in series relation with track battery TB 102 and is normally de-energized but will be energized by the presence of a train in track section T 102. The purpose of the low resistance track relay A 102 will be shown further on.

The line circuit for signal 102 is as follows:—from neutral polar line relay L 102, wire 1, contact 2 of track relay R 102, line wire 3, front contact 4 of line relay L 106 at signal 106, wire 5, wire 6, battery M B 106, wire 7, wire 8, front contact 9 of line relay L 106 and common wire C back to the common terminal of line relay L 102 at signal 102. When line relay L 106 is energized the closed condition of its front contacts 9 and 4 will supply a positive current from battery M B 106 to line wire 3 and to line relay L 102 at signal 102 which will be held energized in the normal magnetic condition, thus holding its polarized armature (not shown) and its polar contact fingers 26 and 35 in their normal or right hand position as shown. The normal position of the polar contacts 26 and 35 is now in a position ready to give the proceed indication on green signal G at signal 102.

When there is a train in track section T 106, track relay R 106 will be de-energized and thus by opening its contact 2 will open the line circuit for line relay L 106, which will be de-energized and its neutral armature (not shown) will fall and its front contacts 9 and 4 will open and its back contacts 11 and 10 will be closed and this will reverse the terminals of battery MB 106 in relation to the line wire 3 and the common wire C, with the result that a negative current, i. e., a current of reverse direction, will pass battery M B 106 to line wire 3 and to line relay L 102 at signal 102. The magnetic condition of line relay L 102 will be reversed and its polar armature (not shown) will be thrown to the opposite position and its polar contact fingers 26 and 35 to the left or reverse position, which closes its reverse polar contacts 37 and 36. The latter are now in a position for giving the cautionary indication on green light signal G at signal 102.

The energized and de-energized conditions of line relay L 106 at signal 106 and its front contacts 9 and 4 and back contacts 11 and 10 provide the actions of a pole changer in place of the usual pole changer mechanism of a semaphore signal.

The polarized flasher relay F 102 will now be described. Polarized relays inherently require reverse currents for their operation. This reverse current is usually supplied by a pole changing device of some suitable form. In the design and operation of the polarized flasher relay F 102 a simple self-acting arrangement is used by means of which the polarized flasher relay supplies its own reverse operating currents from a direct current source without the aid of an external pole changing device, and will now be described in connection with the associated devices which control its operation in giving a green flashlight signal on green signal G at signal 102. The associated devices are the polar contacts 26 and 35 of the polar-neutral line relay L 102 which have been described and also the low resistance track relay A 100 which is usually termed the approach lighting relay.

Assume that there is a train in track section T 106,—this should give a flashing caution signal on green signal G at signal 102. Track relay R 106 is de-energized, also line relay L—106 is de-energized and its neutral armature (not shown) is down thus closing its pole changing back contacts 11 and 10, which will supply a negative or reverse current from battery M B 106 to line wire 3 and to line relay L 102 at signal 102. The line relay L 102 will throw its polar contacts 26 and 35 to the left closing contacts 37 and 36. Everything is now in a condition for giving the flashing caution signal on green light G.

With a following train in track section T 100, approach lighting relay A 100 will be energized and by closing its front contact 21 closes the operating circuit for polarized flasher relay F 102 as follows:—from battery M B 102, wire 6, wire 20, front contact 21 of approach lighting relay A 100, wire 22, wire 23, front contact 24 of line relay L 102, wire 25, polar contacts 26—37, wire 38, wire 38$^a$, right hand coil 39 of polarized flasher relay F 102, wire 40, wire 44, polar contact finger 45, contact 46, wire 47, wire 29$^b$, wire 7 to battery M B 102.

Polarized flasher relay F 102 is of the usual construction except that the two coils 42 and 39 are connected in opposition to each other as shown. That is, if wire 44 was omitted, the current just described would go from coil 39, to wire 40, wire 41, coil 42 and wire 43 to wires 29$^a$, 29$^b$, and 7, to battery M B 102 and the opposing relation of the two coils 39 and 42 would produce no energizing force and no magnetizing flux would result. Wire 44 and polar contact 45 diverts the current from coil 42, and coil 39 only is effective, and this causes a magnetic flux to be set up in both core pieces and the yoke piece in such a direction as will throw the polar armature (not shown) and its polar contact finger 45 to the right, thus closing contact 48 and shunting out coil 39 with coil 42 only in circuit. Coil 42 will now cause a magnetic flux to flow in the opposite direction in the core pieces and yoke, and this will throw the polar finger 45 to the left. These opposite actions will continue as long as either contacts 21, 24 or 37 remain closed.

Briefly stated the direct current from battery M B 102 flows alternately in opposite directions through coil 39 or 42 and this produces alternating magnetic flux conditions in the core pieces and the yoke piece of the magnetic circuit. Polar contact finger 31 will now operate in unison with operating contact finger 45 and opens and closes the flasher circuit to the green light G which is as follows:—from battery M B 102, wire 6, wire 20, contact 21 of approach lighting relay A 100, wire 22, wire 30, contact finger 31 (which may be termed the flasher contact), wire 32, front contact 33 of line relay L 102, wire 34, polar contacts 35, 36, now closed, wire 28, green light G and wires 29, 29$^a$, 29$^b$ and 7 to battery M B 102. Green light G will therefore flash in unison with flasher contact 31 as long as approach lighting relay A 100 is energized by an approaching east bound train.

The polarized flasher relay F 102 is only brought into action for flashing the caution indication on green light G. Polar contact 37 of line relay L 102 provides the selective control for operating flasher relay F 102 at the proper time, that is when a caution indication is to be given.

The slow releasing feature of the flasher relay F 102 produces a slow movement of its polar armature and the operating contact 45. The shunting action of the operating contact 45 also will augment the slow releasing effect of copper slugs on the outer ends of the core pieces. This slow action of the flasher relay gives a slow flashing action of the green light G.

In the drawings illustrating the polarized flasher relay F 102 its polar operating finger 45 is shown in its left hand position. It may, however be in its right hand position. The polar armature of a polarized relay will always remain in the last position in which it was thrown.

The invention as so far described relates to the flash light operation of the green light G. All other actions of the circuits relate to the regular or steady light operation of the red and green lights which are as usual, and may be explained briefly as follows: Assume that the circuits are in their normal condition with no train in track section T 106, track relay R 106 and line relay L 106 are therefore energized, its pole changer contacts 9 and 4 are closed, and the normal or positive current will be supplied from battery M B 106 to line wire 3, to line relay L 102 which will hold its polar contacts 26, 27 in its closed position as shown. An east bound train in track section T 100 will energize approach lighting relay A 100 which will close its contact 21 and clear green signal G in its steady light condition, the light circuit being as follows: from battery M B 102, wire 6, wire 20, contact 21, wire 22, wire 23, contact 24 of line relay L 102, wire 25, polar contacts 26, 27, wire 28, green light G and wires 29, 29$^a$, 29$^b$ and 7, to battery M B 102. The open condition of polar contact 37 leaves the flasher relay F 102 in its normally de-energized condition as shown.

Assume that there is a train in track section T 102, track relay R 102 and line relay L 102 will be de-energized and its front contact 24 will be open and its back contact 18 will be closed. A following train in track section T 100 will energize approach lighting relay A 100 which will close its front contact 21 and close the red light circuit as follows: from battery M B 102, wire 6, wire 20, contact 21, wire 23, back contact 18, wire 19, red light R and wires 29, 29$^a$, 29$^b$, 7 to battery M B 102.

Figure 2:
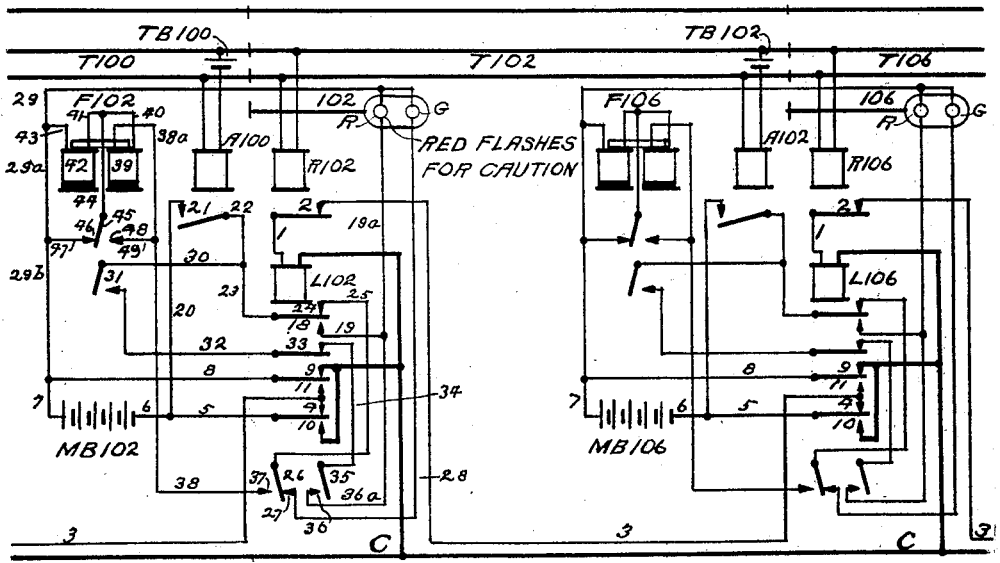
Fig. 2 is a similar diagram, but illustrating another embodiment of the invention in which the danger signal flashes to indicate caution.

In Fig. 2 the flashing operation is applied to the red light R. Otherwise the circuits are the same as in Fig. 1. The operation of the red light flashing circuit is as follows: Assume that there is a train in track section T 106. This, by actions which will now be explained, will give a flashing red light at signal 102 instead of a flashing green light. A following train in track section T 100 will energize approach lighting relay A 100 and this by closing its front contact 21 closes the operating circuit for polarized flasher relay F 102 by a circuit which is the same as has been explained and this will start the operation of the flasher relay F 102 which then operates automatically as previously explained. Flasher contact finger 31 now operates in unison with operating contact 45 and opens and closes the flasher circuit for red light R, the circuit being as follows: from battery M B 102, wire 6, wire 20, contact 21 of approach lighting relay A 100, wire 22, wire 30, flasher contact finger 31, wire 32, contact 33, wire 34, polar contacts 35, 36 (now closed) wire 36$^a$, wire 19$^a$, red light R and wires 29, 29$^a$, 29$^b$, 7, to battery M B 102. Red light R now flashes to give the caution indication.

The red flashing light may be used for other purposes. At an interlocking plant it may be used as a calling or signal to permit a train to pass a stop signal. For this purpose a special line control circuit will be necessary.

A white light may be used instead of the green light. The signal will then give a flashing white light for caution and a steady white light for proceeding.

At an interlocking plant, other color light signals such as blue and purple may be operated as flash light signals each for giving two indications. One flasher relay at the tower may be arranged to operate all flash light signals in the interlocking area.

Figure 3:
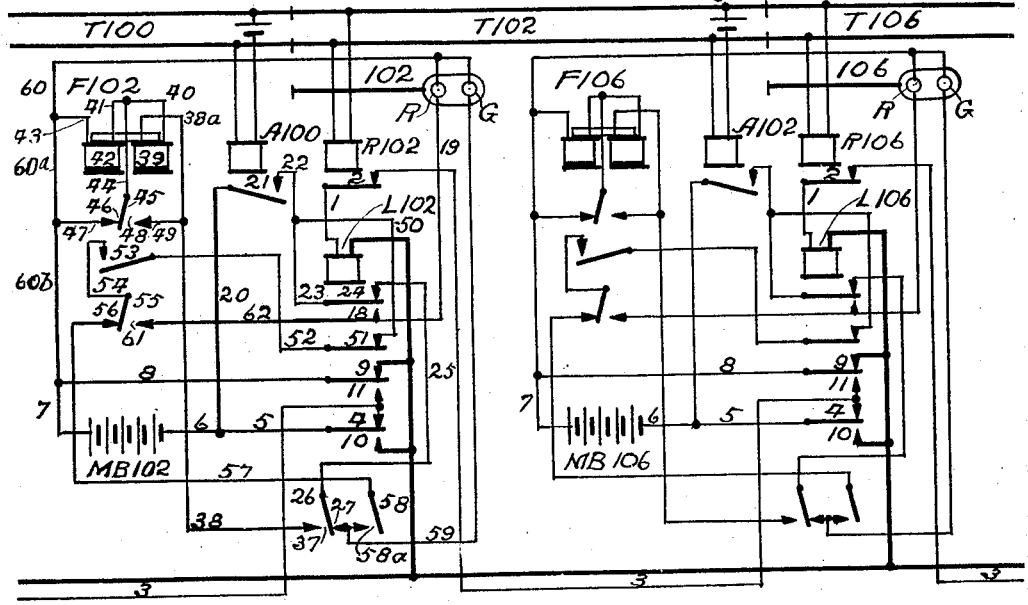
Fig. 3 is a similar diagram but illustrating another embodiment of the invention in which the clear and danger signals flash alternately to indicate caution.

Fig. 3 shows another form of my invention which provides for alternate flashing of the red and green lights for giving the caution indication. For this purpose, a neutral polar line relay is required. The operating circuit for the flasher relay F 102 is the same as in Figs. 1 and 2.

The flash light circuit for the green light G is as follows:—from battery M B 102, wire 6, wire 20, contact 21 of approach lighting relay A 100, wire 22, wire 50, contact 51 of line relay L 102, wire 52, neutral flasher contact 53 of flasher relay F 102, wire 54, polar flasher contacts 55, 56, wire 57, polar contact 58 of line relay L 102, wire 59, green light G, wires 60, 60$^a$, 60$^b$, wire 7 to battery M B 102. The flash light circuit for red light R is as follows:—from battery M B 102, wire 6, wire 20, contact 21 of approach relay A 100, wire 22, wire 50, contact 51 of line relay L 102, wire 52, neutral flasher contact 53, wire 54, polar flasher contacts 55, 61, wire 62, wire 19 red light R, wire 60, 60$^a$, 60$^b$ and wire 7 to battery M B 102.

Neutral flasher contact 53 controls both the green and the red light circuits. Polar flasher contacts 55, 56 control the green light G and polar flasher contacts 55, 61 control the red light R. When flasher relay F 102 is in operation its polar flasher contacts 56 and 61 are closed and opened alternately and the green light G and red light R flash alternately.

The operation of the circuits may now be explained by assuming the presence of a train in track section T 106 which as previously explained will de-energize line relay L 106 and this by closing its back contacts 11 and 10 will supply a reverse current from battery M B 106 to line wire 3 which will reverse the magnetic condition of line relay L 102 at signal 102 and this reversal will throw its polar contact fingers 26 and 58 to the left. Everything is now in a position for giving the caution indication at signal 102. An east bound train in track section T 100 will energize approach lighting relay A 100 and close its front contact 21 which will close the operating circuit for flasher relay F 102 which is the same as previously explained. This puts neutral polar flasher relay F 102 in operation the same as has been explained. Neutral flasher contact 53 now operates and closes and opens the flasher circuit for the red light R and the green light G as follows: from battery M B 102, wire 6, wire 20, contact 21, wire 22, wire 50, contact 51 of line relay L 102, wire 52, neutral flasher contact 53, wire 54, polar flasher finger 55, contact 56, wire 57, polar contact finger 58 of line relay L 102 (now closed) contact 58$^a$, wire 59, green light G, wires 60, 60$^a$, 60$^b$ and wire 7 to battery M B 102. While polar flasher contact 56 is closed, the green light G is aglow. When polar contact 55 is thrown to the right the green light circuit will be open and the red light circuit will be closed as follows: from battery M B 102, wire 6, wire 20, contact 21 of approach lighting relay A 100, wire 22, wire 50, contact 51 of line relay L 102, wire 52, neutral flasher contact 53, wire 54, polar flasher contact finger 55, contact 61, wire 62, wire 19, red light R, wires 60, 60$^a$, 60$^b$, wire 70 to battery M B 102. Red light R will now be aglow instead of green light G. The green light and the red light therefore flash alternately and give the caution indication at signal 102.

The purpose of the neutral flasher contact 53 is to insure that the flasher light circuit will remain open when the flasher relay F 102 is de-energized.

Alternately flashing the green and red lights provides a very conspicuous aspect for giving the caution indication.

The flash light circuit arrangement as shown in Fig. 3 may be used as a substitute for either of the circuits shown in Figs. 1 and 2. By omitting the left hand polar contact 56, wire 57 and polar contact 58 of line relay L 102 the red light only will flash. In a similar way by omitting the right hand polar contact 61 and wire 62, the green light only will flash.

I claim:

1. In a railway signal system, a stretch of track divided into block sections, a two color light signal, governing traffic in each section, a line relay, a flasher device, a track relay, and an approach lighting relay for each section, a circuit for each line relay arranged to be reversed in direction of current flow upon energization and deenergization of an advance line relay, means by which each line relay circuit is opened or closed by its track relay, a light circuit for each color light of each signal closed alternately by the energized and deenergized condition of the corresponding line relay and also controlled by the approach lighting relay of a rear section, one of the light circuits being also controlled jointly by its corresponding flasher device and line relay, and a circuit for each flasher device controlled by the corresponding line relay, and the approach lighting relay of a rear track section.

2. In a railway signal system, a stretch of track divided into block sections, a two color light signal governing traffic in each section, a line relay, a flasher device, a track relay, and an approach lighting relay for each section, a circuit for each line relay arranged to be reversed in direction of current flow upon energization and deenergization of an advance line relay, means by which each line relay circuit is opened or closed by its track relay, a light circuit for each color light of each signal closed alternately by the energized and deenergized condition of the corresponding line relay and also controlled by the approach lighting relay of a rear section, one of the light circuits being also controlled jointly by its corresponding flasher device and line relay, and a circuit for each flasher device completed jointly by the reversal of polarity of its line relay and by an operation of the approach lighting relay of a rear track section when a train enters that section.

3. In a railway signal system, a stretch of track divided into block sections, a two color light signal governing traffic in each section, a line relay, a flasher device, a track relay, and an approach lighting relay for each section, a circuit for each line relay arranged to be reversed in direction of current flow upon energization and deenergization of an advance line relay, means by which each line relay circuit is opened or closed by its track relay, a light circuit for each color light of each signal closed alternately by the energized and deenergized condition of the corresponding line relay and also controlled by the approach lighting relay of a rear section, said light circuits being also controlled jointly by the flasher device and line relay of that signal, said flasher device operating automatically to flash the lights of its signal alternately, and a controlling circuit for each flasher device controlled by the corresponding line relay and the approach lighting relay of a rear track section.

4. In a railway signal system, a stretch of track divided into block sections, a two color light signal governing traffic in each section, a line relay, a flasher device, a track relay, and an approach lighting relay for each section, a circuit for each line relay arranged to be reversed, circuits for the lights of each signal, the circuit of one of the lights being completed by the line relay of that signal when energized and the other being completed by the line relay of that signal when deenergized, and means including an approach lighting relay controlled by a track section rearwardly of each signal for normally interrupting the light circuit of that signal and effective upon the presence of a train in said rear section to close for that signal the light which is completed by the line relay.

5. In a railway signal system, a stretch of track divided into block sections, a two-color light signal at the entrance to each section and governing traffic in that section, a circuit for each color light of each signal, means rendered active by a train in any section for closing a circuit to one light of the governing signal of that section and interrupting the other color light of the same signal, means controlled by a track section approaching the signal for normally interrupting the circuits of the signal lights and closing them when a train is in said section approaching the signal, and automatic means for causing a flashing of one of the color lights of a signal when trains are in sections at each side of the section with said flashing signal.

6. In a railway signal system, a stretch of track divided into block sections, a two-color light signal at the entrance to each section and governing traffic in that section, a circuit for each color light of each signal, means rendered active by a train in any section for closing a circuit to one light of the governing signal of that section and interrupting the other color light of the same signal, means controlled by a track section approaching the signal for normally interrupting the circuits of the signal lights and closing them when a train is in said section approaching the signal, and automatic means for causing a flashing of the color lights of a signal alternately when trains are in sections at each side of the section with said flashing signal.

7. In a railway signal system, a stretch of track divided into block sections, a light signal governing traffic in each section, means rendered active by a train in any section for controlling the illumination of a light of the signal governing traffic in that section, and means controlled by the preceding means when operative to permit an illumination of a signal light governing traffic in its section for controlling a flashing of a signal light at a signal governing traffic in a section to the rear of the section in which a train may be.

8. In a railway signal system, a stretch of track divided into block sections, a multi-light signal governing traffic in each section, one of the lights designating "danger" and the other "proceed", means controlled by a train in any section for permitting a lighting of the danger light of the signal governing traffic in that section, means controlled by the preceding means when operative to permit an illumination of the danger signal for producing a flashing of a signal light at a signal governing traffic in a section to the rear of the section in which a train may be, to indicate caution, and means normally preventing illumination of all of said signals and rendered operative to permit an illumination of one of the lights of the signal for each section as hereinbefore set forth by the presence of a train in a track section to the rear of such section.

9. In a railway signal system, a stretch of track divided into block sections, a multi-light signal governing traffic in each section, one of the lights designating "danger" and the other "proceed", means controlled by a train in any section for permitting a lighting of the danger light of the signal governing traffic in that section, and means controlled by the preceding means when operative to permit an illumination of the danger signal for producing an alternate flashing of the signal lights at a signal governing traffic in a section to the rear of the section in which a train may be, to indicate caution.

10. In a railway signal system, a stretch of track divided into block sections, a multi-light signal governing traffic in each section, one of the lights designating "danger" and the other another traffic condition, means rendered active by a train in any section for effecting a lighting of the danger light of the signal governing traffic in that section, and means controlled by the preceding means for producing a flashing of a signal light at a track section in the rear of said any section for indicating the traffic condition in said any section.

11. In a railway signal system, a stretch of track divided into block sections, a multi-light signal governing traffic in each section, one of the lights designating "danger" and the other another traffic condition, means rendered active by a train in any section for effecting a lighting of the danger light of the signal governing traffic in that section, and means controlled by the preceding means for producing an alternate flashing of the signal lights at a track section to the rear of said any section for indicating a traffic condition in said any section.

12. In a railway signal system, a stretch of track divided into block sections, a multi-light signal governing traffic in each section, one of the lights designating "danger" and the other another traffic condition, means rendered active by a train in any section for effecting a lighting of the danger light of the signal governing traffic in that section, means controlled by the preceding means for producing an alternate flashing of the signal lights at a track section to the rear of said any section for indicating a traffic condition in the last named section, and means normally preventing illumination of each signal and rendered operative to permit an illumination as hereinbefore set forth by the presence of a train in a track section to the rear of said signal.

13. In a railway signal system, a stretch of track divided into block sections, a multi-light signal governing traffic in each section, means rendered active by a train in any section for effecting a lighting of one light of the signal for that section and governing traffic approaching in the same direction, and means controlled by the preceding means, and effective when the latter is operative to cause an illumination of said one signal light, for causing a flashing of a signal light at a signal governing traffic in another section in the rear of said one signal light.

14. In a railway signal system, a stretch of track divided into block sections, a multi-light signal governing traffic in each section, means rendered active by a train in any section for effecting a lighting of one light of the signal for that section and governing traffic approaching in the same direction, means controlled by the preceding means, and effective when the latter is operative to cause an illumination of said one signal light, for causing a flashing of a signal light at a signal governing traffic in another section in the rear of said one signal light, and means normally preventing illumination of all of said signals and rendered operative to permit their illumination as hereinbefore set forth by the presence of a train in a track section to the rear of each signal, as each signal is approached by the train.

15. In a railway signal system, a stretch of track divided into block sections, a multi-light signal governing traffic in each section, means rendered active by a train in any section for effecting a lighting of one light of the signal for that section and governing traffic approaching in the same direction, and means controlled by the preceding means, for causing a flashing of a light of another signal at a track section to the rear of said any section for indicating the traffic condition in said any section.

16. In a railway signal system, a stretch of track divided into block sections, a two color light signal governing traffic in each section, a polarized line relay, a track relay, an approach lighting relay, and a flasher relay for each section, the track relay and approach lighting relay being directly controlled by their corresponding track section, each line relay being controlled by its track relay and by the polar contacts of a line relay of another section in advance of the signal associated with said each line relay, a circuit for the danger light of each signal completed jointly by one condition of energization of the line relay for that signal and the approach lighting relay of a track section in the rear of said signal, a circuit for the other color light of each signal completed by another condition of energization of said line relay and said approach lighting relay, and means controlled jointly by each line relay when its polarity is reversed, the flasher relay of that signal and the approach lighting relay of a track section in the rear of said signal for causing a flashing of a color light of a signal as a caution signal when trains are in adjacent sections at both ends of the section controlled by said flashing color light.

17. In a railway signal system, a stretch of track divided into block sections, a two color light signal governing traffic in each section, a polarized line relay, a track relay, an approach lighting relay, and a flasher relay for each section, the track relay and approach lighting relay being directly controlled by their corresponding track section, each line relay being controlled by its track relay and also as to polarity by the line relay of another section in advance of its signal, a circuit for the danger light of each signal completed jointly by one condition of energization of the line relay for that signal and the approach lighting relay of a track section in the rear of said signal, a circuit for the other color light of each signal completed by another condition of energization of said line relay and the approach lighting relay of said rear track section, and means controlled jointly by each line relay when its polarity is reversed, the flasher relay of that signal and the approach lighting relay of a track section to the rear of said signal for causing an alternate flashing of the color lights of a signal as a caution signal when trains are in sections adjacent both ends of the section controlled by said flashing signal.

18. In a railway signal system, a stretch of track divided into block sections, a two color light signal governing traffic in each section, a polarized line relay, a track relay, an approach lighting relay, and a self-acting polarized flasher relay for each section, the track relay and approach lighting relay being directly controlled by their corresponding track section, each line relay being controlled by its track relay and by the polar contacts of a line relay of another section in advance of its signal, a circuit for the danger light of each signal completed jointly by one condition of energization of the line relay for that signal and the approach lighting relay of a track section in the rear of said signal, a circuit for the other color light of each signal completed by another condition of energization of said line relay and the approach lighting relay of a track section in the rear of said signal, and means controlled jointly by each line relay when its polarity is reversed, the flasher relay of that signal and the approach lighting relay of a track section in the rear of said signal for causing a flashing of a color light of a signal as a caution signal when trains are in sections adjacent both ends of the section controlled by said flashing color light.

19. In a railway signal system, a stretch of track divided into block sections, a two color light signal governing traffic in each section, a polarized line relay, a track relay and an approach lighting relay for each section, each line relay being controlled by its track relay, and by the polar contacts of a line relay of another section in advance of its signal, a circuit for the danger light of each signal controlled jointly by one condition of energization of the line relay for that signal and the approach lighting relay of a track section to the rear of said signal, a circuit for the other color light of each signal controlled jointly by another condition of energization of said line relay and the approach lighting relay of said rear track section, and means controlled jointly by each line relay, when its polarity is reversed, and the approach lighting relay of a track section to the rear of said signal for causing a flashing of a color light of a signal as a caution signal when trains are in sections adjacent both ends of the section controlled by said flashing color light.

20. In a railway signal system, a stretch of track divided into block sections, a two color light signal governing traffic in each section, a polarized line relay, a track relay and an approach lighting relay for each section, each line relay being controlled by its track relay and by the polar contacts of a line relay of another section in advance of its signal, a circuit for the danger light of each signal controlled jointly by one condition of energization of the line relay for that signal and the approach lighting relay of a track section to the rear of said signal, a circuit for the other color light of each signal controlled jointly by another condition of energization of said line relay and the approach lighting relay of a track section to the rear of said signal, and means controlled jointly by each line relay, when its polarity is reversed, and the approach lighting relay of a track section to the rear of said signal, causing an alternate flashing of the color lights of a signal as a caution signal when trains are in sections adjacent both ends of the section controlled by said flashing signal.

21. In a railway signal system, a stretch of track divided into block sections, a two color light signal governing traffic in each section, a polarized line relay, and a track relay for each section, each line relay being controlled by its track relay and by the polar contacts of a line relay of another section in advance of its signal, a circuit for one of the color lights of each signal controlled by one condition of energization of the line relay for that signal, a circuit for the other color light of each signal controlled by another condition of energization of said line relay, and means rendered active by each line relay when its polarity is reversed for causing a flashing of a color light of its signal as the third signal effect of that signal.

22. In a railway signal system, a stretch of track divided into block sections, a two color light signal governing traffic in each section, a polarized line relay, and a track relay for each section, each line relay being controlled by its track relay and by the polar contacts of a line relay of another section in advance of its signal, a circuit for one of the color lights of each signal controlled by one condition of energization of the line relay for that signal, a circuit for the other color light of each signal controlled by another condition of energization of said line relay, and means rendered active by each line relay when its polarity is reversed for causing an alternate flashing of said color lights of its signal as the third signal effect of that signal.

23. In a railway signal system, a stretch of track divided into block sections, a light signal governing traffic in each section, means rendered active by a train in any section for controlling the lighting of a light of the signal governing traffic in that section and the flashing of a light of the signal governing traffic in a section in the rear of the train, and means for also controlling said signals permitting their display when trains approach said signals and preventing display at all other times.

24. In a railway signal system, a stretch of track divided into block sections, a light signal governing traffic in each section, means rendered active by a train in any section for controlling the lighting of a light of the signal governing traffic in that section and the flashing of a light of the signal governing traffic in a section in the rear of the train, and means for also controlling said signals and rendered operative automatically by a train approaching any signal for permitting an illumination of the lights of said signals as approached under the control of said first mentioned means.

In witness whereof, I hereunto subscribe my signature.

ROBERT J. HEWETT.